(12) United States Patent
Tanabe et al.

(10) Patent No.: US 8,853,982 B2
(45) Date of Patent: Oct. 7, 2014

(54) MOTOR CONTROL DEVICE

(75) Inventors: Akira Tanabe, Chiyoda-ku (JP); Kazuaki Ando, Chiyida-ku (JP); Noriyasu Hasegawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 18 days.

(21) Appl. No.: 13/878,379

(22) PCT Filed: Nov. 15, 2010

(86) PCT No.: PCT/JP2010/070310
§ 371 (c)(1),
(2), (4) Date: Apr. 8, 2013

(87) PCT Pub. No.: WO2012/066617
PCT Pub. Date: May 24, 2012

(65) Prior Publication Data
US 2013/0193887 A1 Aug. 1, 2013

(51) Int. Cl.
*H02K 29/06* (2006.01)
*H02P 6/00* (2006.01)
*H02P 6/16* (2006.01)
*H02P 7/00* (2006.01)

(52) U.S. Cl.
CPC . *H02P 7/00* (2013.01); *H02P 6/165* (2013.01)
USPC .................. 318/400.32; 318/400.02

(58) Field of Classification Search
CPC ...................................... B60L 15/025
USPC .................. 318/400.32, 400.02
See application file for complete search history.

(56) References Cited

FOREIGN PATENT DOCUMENTS

| JP | 63-31493 A | 2/1988 |
|---|---|---|
| JP | 2-101980 A | 4/1990 |
| JP | 11-27973 A | 1/1999 |
| JP | 2003-83769 A | 3/2003 |

OTHER PUBLICATIONS

International Search Report for PCT/JP2010/070310 dated Dec. 7, 2010.

*Primary Examiner* — Erick Glass
(74) *Attorney, Agent, or Firm* — Sughrue Mion, PLLC

(57) ABSTRACT

The present invention provides a motor control device including a feedback control system that generates a torque command for reducing a difference between an operation command signal for commanding an operation of a motor and a detection signal of a detector attached to the motor to detect a position and speed of the motor and drives the motor. The motor control device includes a correcting unit configured to estimate an amplitude and a phase of a correction amount for suppressing the detection error included in the detection signal and sequentially update estimation values of the amplitude and the phase and a post-correction-detection-signal calculating unit configured to generate a post-correction detection signal, which is a difference between the detection signal and the correction amount, instead of the detection signal.

10 Claims, 8 Drawing Sheets

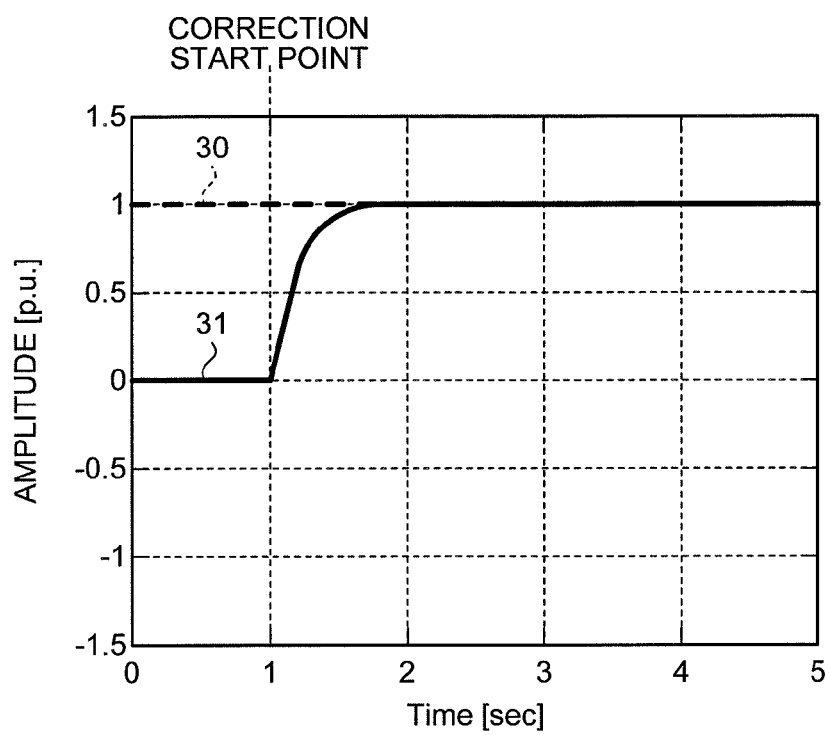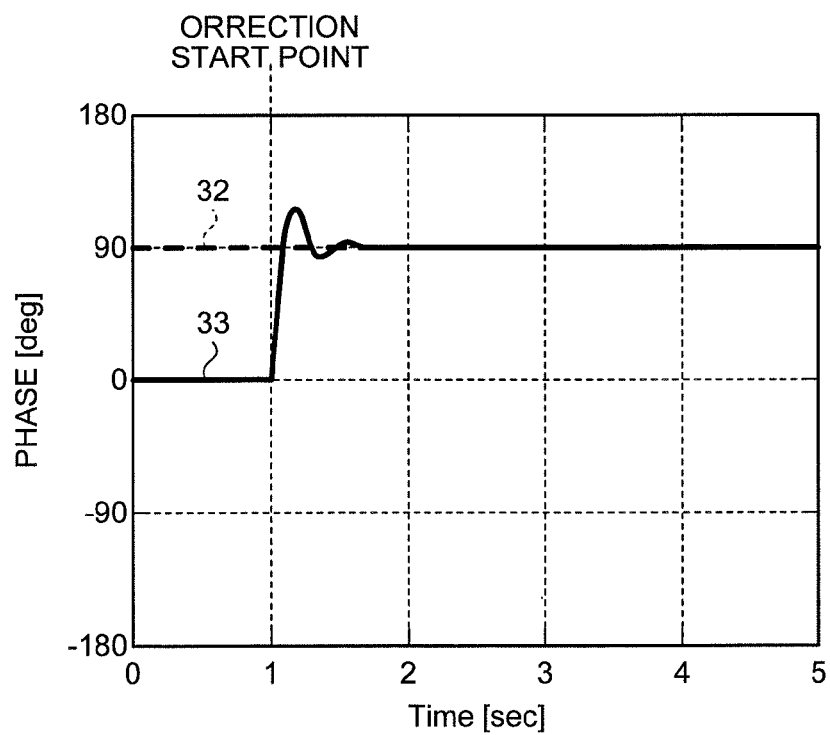

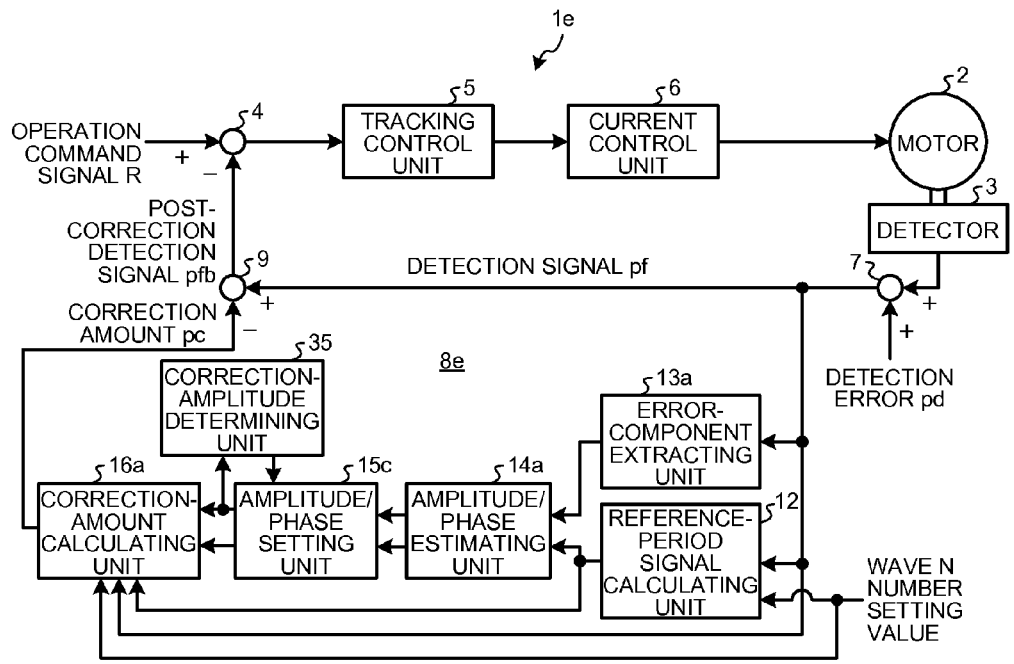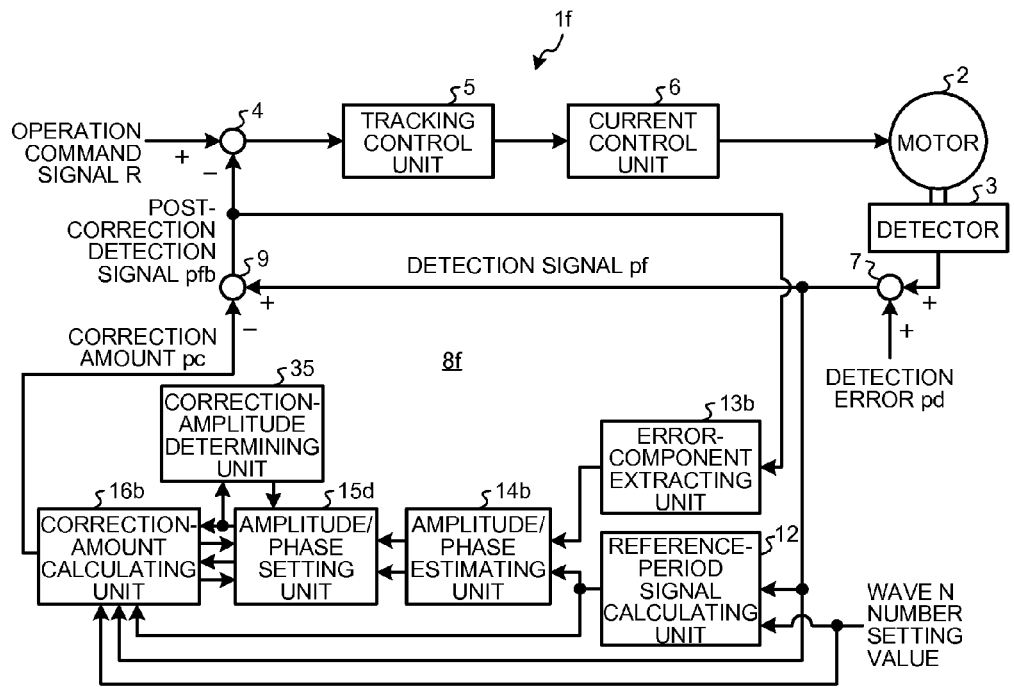

MOTOR CONTROL DEVICE

CROSS REFERENCE TO RELATED APPLICATIONS

This application is a National Stage of International Application No. PCT/JP2010/070310 filed Nov. 15, 2010, the contents of which are incorporated herein by reference in their entirety.

FIELD

The present invention relates to a motor control device that controls a motor for driving an industrial machine such as a machining tool.

BACKGROUND

As the motor control device that controls the motor for driving the industrial machine, there is known a motor control device that controls a motor such that a rotating position (a rotating angle) and speed of the motor detected by a detector such as a rotary encoder connected to a rotating shaft of the motor follow up target positions.

It is known that, in the detector such as the rotary encoder, a detector error occurs in a detection signal because of an assembly error, a shape error, or the like of the detector. For example, in a magnetic detector, a section to be detected imparted with a magnetic characteristic that periodically changes in association with the rotation of the rotating shaft of the motor is used. The magnetic detector detects magnetism with a magnetic sensor arranged in the vicinity of the motor to detect a rotating position of the motor. In the magnetic detector, when there is an error in a magnetization distribution or an attachment error of the magnetic sensor, a periodical detection error depending on the rotating position occurs.

The detection error that periodically occurs according to the rotating position included in the detection signal of the detector in this way adversely affects driving performance of a machine. Therefore, there have been proposed various systems for enabling highly accurate driving by suppressing such a detection error on the control device side (see, for example, Patent Literatures 1 and 2).

Patent Literature 1 discloses a technology for preparing a high-precision detector besides a detector used for driving control, comparing a position detected by the detector used for the driving control and a position detected by the highly-precision detector to calculate a detection error and store the detection error in a control device and correcting the stored detection error with respect to a rotation command position to the motor.

Further, Patent Literature 1 discloses, as a system in which the high-precision detector is not used, a technology for calculating a detection error based on a detection signal in a state in which a motor is rotated at sufficient speed that a speed loop characteristic for controlling the motor does not follow up and a technology for calculating a detection error based on a detection signal in a state in which a motor is rotated with a speed loop opened, i.e., without using a signal of a detector.

Patent Literature 2 discloses, as a system for performing correction to offset a periodically-occurring detection error using a correction amount of the same period calculated by a trigonometric function operation, a technology for searching for optimum values of an amplitude (a gain) and a phase of a correction amount to minimize the amplitude of the detection error.

CITATION LIST

Patent Literature

Patent Literature 1: Japanese Patent Application Laid-open No. 11-27973
Patent Literature 2: Japanese Patent Application Laid-open No. 2003-83769

SUMMARY

Technical Problem

However, the technologies disclosed in Patent Literature 1 have problems explained below. First, in the system for separately preparing the high-precision detector and calculating a detection error, work for attaching the high-precision detector is required and work time thus increases.

In the system for rotating the motor at sufficient speed that a speed loop characteristic does not track and measuring a detection signal without using the high-precision detector, usually, because data sampling is performed at every fixed time, a sampling period is insufficient and measurement accuracy is deteriorated when a detection error occurs at a high frequency.

In the system for calculating a detection error based on a detection signal in a state in which the motor is rotated with a speed loop opened, because it is difficult to rotate the motor without speed unevenness, it is difficult to highly accurately correct a detection error when the detection error is very small.

In the technology disclosed in Patent Literature 2, an amplitude and a phase of a correction amount for minimizing a detection error are searched for based on the amplitude of the detection error. However, to avoid interference, it is necessary to search for the amplitude and the phase respectively at different steps. In particular, when the phase is searched for in the entire range, there is a problem in that time is required for adjusting work.

The present invention has been devised in view of the above and it is an object of the present invention to obtain a motor control device that can accurately suppress, with simple processing and in a short time, a detection error that occurs because of an assembly error, a shape error, or the like of a detector.

Solution to Problem

In order to solve the aforementioned problems, a motor control device including a feedback control system that generates a torque command for reducing a difference between an operation command signal for commanding an operation of a motor and a detection signal of a detector attached to the motor to detect a position and speed of the motor and drives the motor according to one aspect of the present invention is configured to include: a correcting unit configured to estimate, according to a wave number set as the number of occurrences of a detection error included in the detection signal per one revolution of the motor, an amplitude and a phase of a correction amount for suppressing the detection error and sequentially update estimation values of the amplitude and the phase; and a post-correction-detection-signal calculating unit configured to generate, as a target signal for calculating a difference from the operation command signal, a post-correction detection signal, which is a difference between the detection signal and the correction amount, instead of the detection signal.

Advantageous Effects of Invention

According to the present invention, an amplitude and a phase of a detection signal in a phase of occurrence of a detection error, which occurs according to a rotating position of the motor, are sequentially estimated and an amplitude and a phase of a correction amount for suppressing the detection error are respectively updated based on results of the estimation.

Therefore, for example, there are effects explained below. To calculate the amplitude and the phase of the correction amount for suppressing the detection error, it is unnecessary to determine the amplitude and the phase at separate steps. Therefore, it is possible to calculate, in a short time and with simple processing, a correction amount for suppressing periodical oscillation due to the detection error. Because it is possible to calculate the correction amount without the necessity of driving the motor at sufficiently high speed that a speed loop characteristic does not track or with a speed loop opened, it is possible to highly accurately calculate the correction amount. Further, because it is possible to calculate the correction amount without using a separate high-precision detector, it is possible to easily perform adjustment work.

BRIEF DESCRIPTION OF DRAWINGS

FIG. 5 is a characteristic chart for explaining an estimation result of an amplitude of a correction amount estimated by the correction-amount calculating unit shown in FIG. 1.

FIG. 6 is a characteristic chart for explaining an estimation result of a phase of the correction amount estimated by the correction-amount calculating unit shown in FIG. 1.

FIG. 11 is a block diagram of the configuration of a motor control device according to a fifth embodiment of the present invention.

FIG. 12 is a block diagram of the configuration of a motor control device according to a sixth embodiment of the present invention.

DESCRIPTION OF EMBODIMENTS

Embodiments of a motor control device according to the present invention are explained in detail below based on the drawings. The present invention is not limited by the embodiments.

First Embodiment

Figure 1:
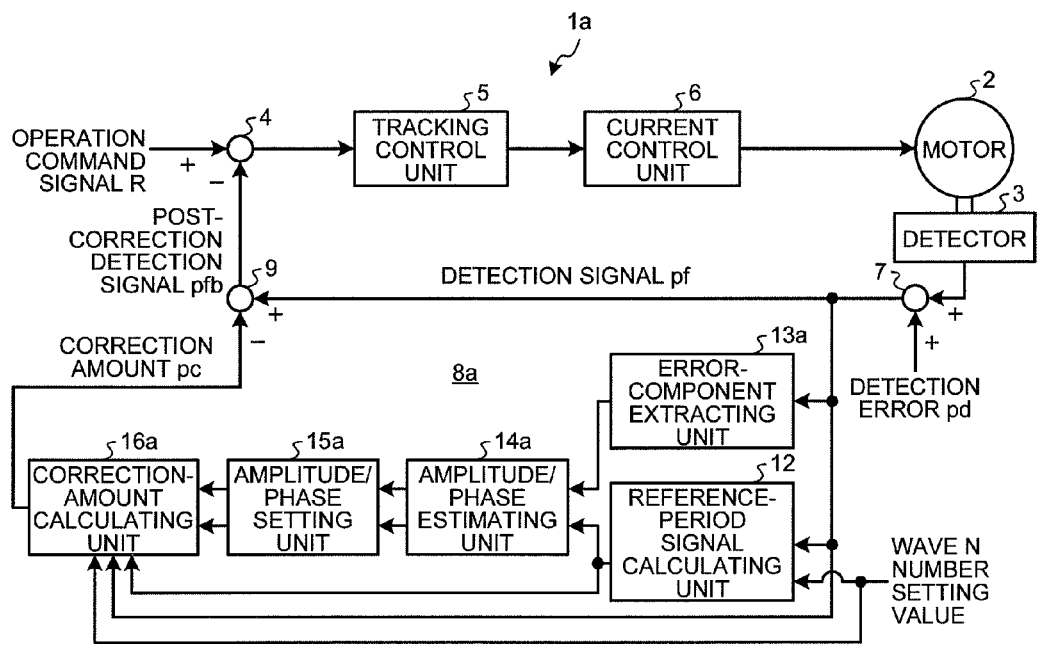
FIG. 1 is a block diagram of the configuration of a motor control device according to a first embodiment of the present invention.

FIG. 1 is a block diagram of the configuration of a motor control device according to a first embodiment of the present invention. In FIG. 1, in a motor control device 1a according to the first embodiment, a correcting unit 8a and an adder 9 are added to a basic configuration including a detector 3, an adder 4, a tracking control unit 5, and a current control unit 6 for driving a motor 2.

The basic configuration including the detector 3, the adder 4, the tracking control unit 5, and the current control unit 6 for driving the motor 2 is briefly explained. An operation command signal R input from the outside is a command signal for designating the operation of the motor 2 such as a position command and a speed command. The operation command signal R is input to an addition input end (+) of the adder 4. The detector 3 is a rotary encoder or the like that detects a rotating position (a rotating angle) and speed of the motor 2. The detector 3 is coupled to a rotating shaft of the motor 2. A detection signal pf output by the detector 3 is input to a subtraction input end (−) of the adder 4 in the basic configuration.

In the basic configuration, the adder 4 outputs a difference (a deviation) obtained by subtracting the detection signal pf from the operation command signal R. The tracking control unit 5 applies processing including a proportional operation and an integration operation to the deviation between the operation command signal R and the detection signal pf output by the adder and outputs a torque command for reducing the deviation. A gain value and the like for the processing including the proportional operation and the integration operation are set in the tracking control unit 5. The current control unit 6 outputs a driving current for driving the motor 2 based on the torque command input from the tracking control unit 5.

In this way, the basic configuration including the detector 3, the adder 4, the tracking control unit 5, and the current control unit 6 for driving the motor 2 configures a feedback control system that generates a torque command and drives the motor 2 such that the detection signal pf, which is a detection result of the detector 3, tracks a target value indicated by the operation command signal R.

The detection signal pf of the detector 3 usually includes a detector error pd that periodically occurs according to a rotating position because of an assembly error, a shape error, or the like of the detector 3. The correcting unit 8a and the adder 9 added to the basic configuration are provided to suppress the detection error pd.

Therefore, in FIG. 1, to facilitate understanding, the detection error pd included in the detection signal pf of the detector 3 is extracted and shown to treat the detection error pd as a disturbance. The adder 7 adds the detection error pd, which is the disturbance, to an output signal (not including a detection error) of the detector 3 to obtain the detection signal pf.

In the configuration in which the adder 9 is added according to the first embodiment, the detection signal pf including the detection error pd is input to an addition input end (+) of the adder 9 rather than the subtraction input end (−1) of the adder 4. A correction amount pc calculated by the correcting unit 8a is input to the subtraction input end (−) of the adder 9. A difference between the detection signal pf and the correction amount pc calculated by the adder 9 is input to the subtraction input end (−) of the adder 4 as a post-correction detection signal pfb. That is, the adder 9 configures a post-correction detection signal calculating unit that generates the post-correction detection signal pfb.

In the configuration according to the first embodiment, if the correction amount pc can be matched to the detection error pd, the detection error pd is offset. Therefore, the configuration indicates that the post-correction detection signal pfb is a detection signal with the detection error pd suppressed. First, this point is explained with reference to FIG. 2. Thereafter, the correcting unit 8a is explained in detail.

Figure 2:
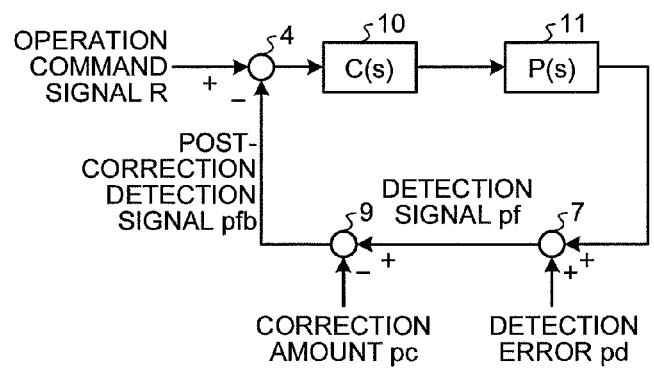
FIG. 2 is a block diagram in which the configuration of a feedback control system shown in FIG. 1 is indicated by transfer functions.

FIG. 2 is a block diagram in which the configuration of the feedback control system shown in FIG. 1 is indicated by transfer functions. In FIG. 2, the feedback control system shown in FIG. 1 is indicated by the adder 4, a controller 10 corresponding to the tracking control unit 5, a control system 11 including the current control unit 6, the motor 2 and the detector 3, and the adders 7 and 9. A transfer function of the controller 10 is represented as C(s) and a transfer function of the control system 11 is represented as P(s).

In the feedback system shown in FIG. 2, a sensitivity function S is represented by Formula (1) and a complementary sensitivity function T is represented by Formula (2).

$$S = 1/(1+CP) \quad (1)$$

$$T = CP/(1+CP) \quad (2)$$

When the detection signal pf is described using the sensitivity function S and the complementary sensitivity function T focusing only on a frequency component of the detection error pd, the detection signal pf in a phase of occurrence of the detection error pd can be represented by Formula (3) using the correction amount pc and the detection error pd.

$$pf = T \cdot pc + S \cdot pd \quad (3)$$

The substance of the detection error pd is unknown. Therefore, it is difficult to directly calculate the correction amount pc that matches the detection error pd. On the other hand, the detection error pd periodically occurs according to a rotating position of the motor 2. Therefore, an angular phase of the occurrence of the detection error pd can be calculated from the number of times of the detection error pd that occurs per one revolution of the motor 2 (this is referred to as "wave number"). The first embodiment focuses on this point.

That is, in the first embodiment, an estimating operation for estimating an amplitude and a phase of the detection signal pf in an angular phase in which the detection error pd occurs and setting the amplitude and the phase as an amplitude and a phase of the correction amount pc is repeated according to the period of the wave number. Then, estimation value of the amplitude and the phase of the correction amount pc are updated to be closer to the amplitude and the phase of the detection signal pf. Therefore, as explained below, a detection signal with the detection error pd suppressed in the post-correction detection signal pfb is obtained.

To update the correction amount pc to be closer to the detection signal pf, the detection signal pf calculated by Formula (3) is used as the correction amount pc. When the detection signal pf represented by Formula (3) is in an updated state at the arbitrary kth time, a detection signal pf(k+1) at the (k+1)$_{th}$ time of update is represented by Formula (4).

$$pf(k+1) = T(T \cdot pc(k) + S \cdot pd) + S \cdot pd \quad (4)$$
$$= T(T \cdot pc(k) + S \cdot pd) + (1-T)pd$$

Similarly, when the detection signal pf is updated k+2 times, k+3 times, . . . and k+n times, a detection signal pf(k+n) at the (k+n)$_{th}$ time of update is represented by Formula (5).

$$pf(k+n) = T^n(T \cdot pc(k) + S \cdot pd) + (1-T^n)pd \quad (5)$$

In Formula (5), when the complementary sensitivity function T at the frequency of the detection error pd is smaller than a value 1, the complementary sensitivity function $T^n$ converges to 0 according to the repetition of the update. That is, the detection signal pf converges to the detection error pd. Therefore, the correction amount pc repeatedly updated to the detection signal pf converges to the detection error pd.

As explained above, it is possible to calculate the correction amount pc for suppressing the detection error pd. In general, the complementary sensitivity function T is smaller than the value 1 outside a control band. Therefore, if the frequency of the detection error pd is outside the control band, the detection error converges.

In FIG. 1, the correcting unit 8a that calculates the correction amount pc explained above includes a reference-period-signal calculating unit 12, an error-component extracting unit 13a, an amplitude/phase estimating unit 14a, an amplitude/phase setting unit 15a, and a correction-amount calculating unit 16a.

The detection signal pf output by the detector 3 and a wave number setting value N, which is a setting value of an external input, are input to the reference-period-signal calculating unit 12. The wave number setting value N is the number of occurrences of the detection error pd per one revolution of the motor 2. The wave number setting value N is known according to the structure of the detector 3. Because the period of the set wave number is the period of the detection error pd, the reference-period-signal calculating unit 12 calculates a reference period signal having an angular period same as the angular period of the detection error pd that occurs according to a rotating position of the motor 2 included in the detection signal pf.

When the detection errors pd having a plurality of periods in different phases of occurrence are included in the detection signal pf output by the detector 3, for example, a plurality of wave number setting values N of the detection errors pd can be stored in a table and sequentially switched and set in the reference-period-signal calculating unit 12.

The error-component extracting unit 13a extracts, from the detection signal pf output by the detector 3, a frequency component of the detection error pd included in the detection signal pf. Specifically, the error-component extracting unit 13a is configured by, for example, a band-pass filter that allows only a frequency component of the detection error pd to pass. That is, an output signal of the error-component extracting unit 13a (a frequency component signal of the detection error pd) is a period signal having a frequency same as the frequency of the detection error pd in the detection signal pf.

The error-component extracting unit 13a is added to improve calculation accuracy for the detection error pd. The error-component extracting unit 13a can be omitted, for example, when the influence of the detection error pd notably appears in the detection signal pf.

The frequency component signal of the detection error pd output by the error-component extracting unit 13a and a reference period signal output by the reference-period-signal calculating unit 12 are input to the amplitude/phase estimating unit 14a. The amplitude/phase estimating unit 14a estimates, for example, with the configuration shown in FIG. 3, an amplitude and a phase of the detection signal pf in a phase of occurrence of the detection error pd. The amplitude/phase estimating unit 14a repeats such an estimating operation according to a period of the reference period signal. The amplitude/phase estimating unit 14a is specifically explained with reference to FIG. 3.

Figure 3:
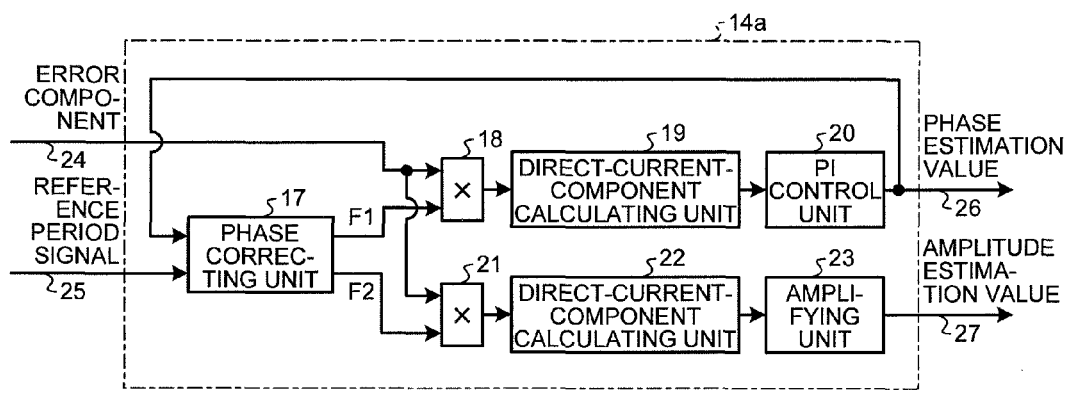
FIG. 3 is a block diagram of a configuration example of an amplitude/phase estimating unit shown in FIG. 1.

FIG. 3 is a block diagram of a configuration example of the amplitude/phase estimating unit 14a. The amplitude/phase estimating unit 14a includes, for example, as shown in FIG. 3, a phase correcting unit 17, multipliers 18 and 21, direct-current-component calculating units 19 and 22, a PI control unit 20, and an amplifying unit 23. The amplitude/phase estimating unit 14a receives the input of an error component (a frequency component signal of the detection error pd) 24 output by the error-component extracting unit 13a and a reference synchronization signal 25 output by the reference-synchronization-signal calculating unit 12 and outputs a phase estimation value 26 and an amplitude estimation value 27.

In FIG. 3, the error component 24 output by the error-component extracting unit 13a is a signal having a period same as the period of the detection error pd included in the detection signal pf. Therefore, it is assumed that the detection signal pf in the phase of occurrence of the detection error pd is a period signal represented by Formula (6). This is one input to each of the multipliers 18 and 21.

$$pf = A\sin(\theta + \alpha) \tag{6}$$

In Formula (6), an amplitude A is an amplitude of the detection signal pf, which is an estimation target. An angle $\theta$ is an angle of the phase of occurrence of the detection error pd that occurs according to the rotating position of the motor 2. The angle $\theta$ can be calculated from the position and the speed of the motor 2 if the "wave number" is known. When the motor 2 is driven at fixed speed, the angle $\theta$ can be calculated from a relation $\theta = \omega t$ using an angular frequency $\omega$ and time t. An angle $\alpha$ is the phase of the detection signal pf, which is an estimation target.

The phase correcting unit 17 outputs period signals F1 and F2 obtained by correcting, based on the phase estimation value 26 output by the PI control unit 20, a phase of the reference period signal 25 having an angular period same as the angular period of the detection error pd output by the reference-period-signal calculating unit 12. The period signal F1 is the other input to the multiplier 18. The period signal F2 is the other input to the multiplier 21.

When the reference period signal 25 is represented as, for example, $\sin(\theta)$ and the phase estimation value 27 is represented as $\beta$, the period signal F1 output from the phase correcting unit 17 is represented by Formula (7) and the period signal F2 is represented by Formula (8).

$$F1 = \cos(\theta + \beta) \tag{7}$$

$$F2 = \sin(\theta + \beta) \tag{8}$$

The multiplier 18 multiplies together the detection signal pf represented by Formula (6) and the frequency signal F1 represented by Formula (7). An output signal of the multiplier 18 is represented by Formula (9).

$$pf \cdot F1 = (A/2)(\sin(2\theta + \alpha + \beta) + \sin(\alpha - \beta)) \tag{9}$$

The direct-current-component calculating unit 19 applies, for example, low-pass filter processing to Formula (4) representing the output signal of the multiplier 18 and calculates "(A/2)sin(α−β)", which is a direct-current component. The PI control unit 20 changes the phase estimation value β in the formula representing the direct-current component to minimize a value of the direct-current component calculated by the direct-current-component calculating unit 19. Consequently, if the direct-current component is minimum, because the phase α of the detection signal pf and the phase estimation value β are equal, it is possible to sequentially estimate the phase α.

The multiplier 21 multiplies together the detection signal pf represented by Formula (6) and the period signal F2 represented by Formula (8). An output signal of the multiplier 18 is represented by Formula (10).

$$pf \cdot F2 = -(A/2)(\cos(2\theta + \alpha + \beta) - \cos(\alpha - \beta)) \tag{10}$$

The direct-current-component calculating unit 22 applies, for example, low-pass filter processing to Formula (10) representing an output signal of the multiplier 21 and calculates "(A/2)cos(α−β)", which is a direct-current component. When the phase α of the detection signal pf and the phase estimation value β are equal, a value of the direct-current component is A/2.

The amplifying unit 23 amplifies the direct-current component input from the direct-current-component calculating unit 22 and outputs the direct-current component as the amplitude estimation value 27. As explained above, the amplitude A of the detection signal pf in the phase of occurrence of the detection error pd, which occurs according to the rotating position of the motor 2, can be sequentially estimated according to the estimation of the phase estimation value β.

When the error-component extracting unit 13a is not used as explained above, the detection signal pf only has to be input instead of the error component 24.

In FIG. 1, the amplitude/phase setting unit 15a sets the amplitude and the phase of the detection signal pf estimated by the amplitude/phase estimating unit 14a as explained above to be used as an amplitude and a phase of the correction amount pc calculated and output by the correction-amount calculating unit 16a and outputs the set amplitude and the set phase to the correction-amount calculating unit 16a.

The amplitude and the phase set by the amplitude/phase setting unit 15a, the detection signal pf output from the detector 3, the reference period signal calculated by the reference-period-signal calculating unit 12, and the wave number setting value N are input to the correction-amount calculating unit 16a.

The correction-amount calculating unit 16a calculates the correction amount pc for suppressing the detection error pd that occurs at the period of the set wave number of the wave number setting value N. That is, the correction-amount calculating unit 16a uses the amplitude and the phase set by the amplitude/phase setting unit 15a as estimation values of the amplitude and the phase of the correction amount pc and updates the estimation values according to the period of the reference period signal. Alternatively, the correction-amount calculating unit 16a updates the estimation values according to the period of the detection error pd in the detection signal pf output from the detector 3. As a result, the correction amount pc is updated to be closer to the detection signal pf. The correction amount pc sequentially updated in this way is output to the subtraction input end (−) of the adder 9. Consequently, the post-correction detection signal pfb, which is the difference between the detection signal pf and the correction amount pc, calculated by the adder 9 is input to the subtraction input end (−) of the adder 4.

Figure 4:
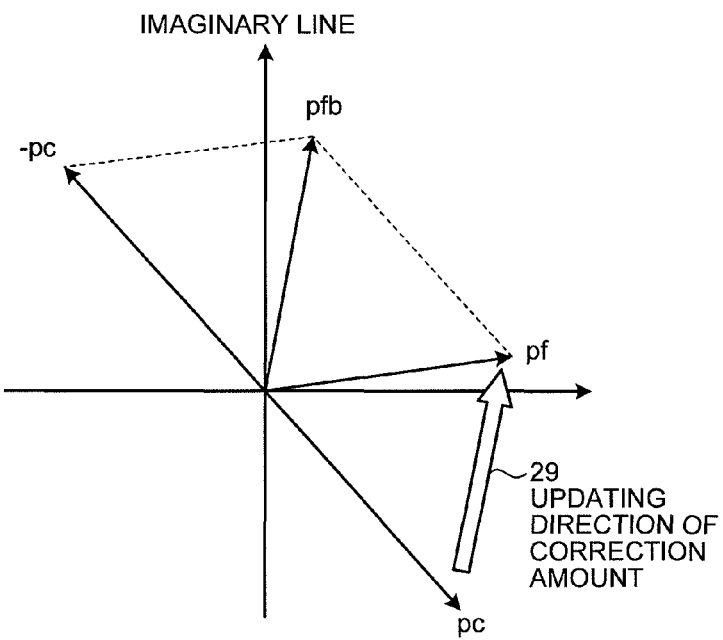
FIG. 4 is a vector diagram for explaining a correction amount estimating operation in a correction-amount calculating unit shown in FIG. 1.

An estimating operation for the correction amount pc is explained with reference to FIG. 4. FIG. 4 is a vector diagram for explaining an estimating operation for a correction amount. In FIG. 4, pieces of information concerning amplitudes and phases of the detection signal pf, the correction amount pc, and the post-correction detection signal pfb at a frequency at which the detection error pd occurs are respectively represented as vectors on a complex plane.

As shown in FIG. 1, the post-correction detection signal pfb is calculated by subtracting the correction amount pc from the detection signal pf in the adder 9. Therefore, a relation among pf, −pc, and pfb can be represented as combination of the vectors as indicated by a dotted line in FIG. 4. An updating direction 29 of the correction amount pc is a direction toward the detection signal pf, i.e., a direction in which the difference between the correction amount pc and the detection signal pf decreases.

In FIG. 4, in a state in which the influence due to the detection error pd is ideally suppressed, because the amplitude in the post-correction detection signal pfb is 0, the correction amount pc and the detection signal pf match. Therefore, as an error with respect to the ideal suppression state, the difference between the correction amount pc and the detection signal pf is used as an update amount of the correction amount pc. The update processing is equivalent to updating the correction amount pc to the detection signal pf by calculating the amplitude and the phase of the detection signal pf in the amplitude/phase estimating unit 14a.

Figure 7:
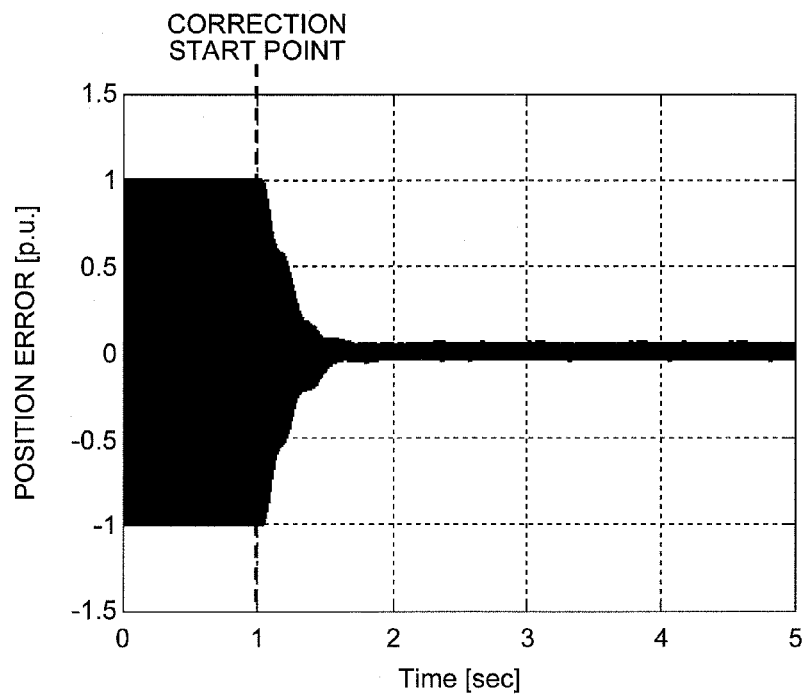
FIG. 7 is a characteristic chart for explaining a suppression state of a phase error involved in the correction amount estimating operation in the correction-amount estimating unit shown in FIG. 1.

An estimating operation for the correction amount pc performed in the correction-amount calculating unit 16a is explained with reference to FIGS. 5 to 7. FIG. 5 is a characteristic chart for explaining an estimation result of an amplitude of a correction amount estimated by the correction-amount calculating unit shown in FIG. 1. FIG. 6 is a characteristic chart for explaining an estimation result of a phase of the correction amount estimated by the correction-amount calculating unit shown in FIG. 1. FIG. 7 is a characteristic chart for explaining a suppression state of a phase error involved in the correction amount estimating operation in the correction-amount estimating unit shown in FIG. 1.

In FIGS. 5 to 7, results obtained by performing a simulation concerning an operation for estimating the correction amount pc while the motor 2 is driven at fixed speed of 10 [r/min] assuming that the detector causes the detection error pd at a period of 512 [waves] per one revolution of the motor 2 are shown.

In FIGS. 5 and 6, solid lines 31 and 33 indicate estimation results of an amplitude and a phase of the correction amount pc. In each of FIGS. 5 and 6, the estimating operation is started from a point of 1 [sec], which is a correction starting point. In FIGS. 5 and 6, broken lines 30 and 32 indicate an amplitude and a phase of an error component added as a detection error. It can be confirmed that the amplitudes and the phases of the correction amount pc and the detection error pd could be matched by the estimating operation. The amplitude of the detection error pd is normalized as 1 [p.u.] and the phase of the detection error pd is set to 90 [deg].

FIG. 7 shows a correction effect involved in the estimating operation. It can be confirmed that a position error during motor rotation decreases according to the estimating operation of the correction amount pc. The magnitude of an oscillation component is normalized such that the magnitude up to 1 [sec] is 1 [p.u.].

In the above explanation, in the processing for updating the correction amount pc to the detection signal pf, the estimated amplitude and the estimated phase of the detection signal pf are directly used as update values of the amplitude and the phase of the correction amount pc. As another updating method, for example, a difference, which is an update amount, is calculated by comparing the correction amount pc before update and the detection signal pf and a value obtained by multiplying the difference with a gain for learning is added to the correction amount pc before update to reduce at least the difference. The processing for updating the correction amount pc can be realized by the method as well.

When such an updating method is adopted, the update amount of the correction amount pc can be set according to the gain for learning. Therefore, it is possible to prevent the correction amount pc from steeply changing. Further, it is possible to calculate an average correction amount pc even when the amplitude and the phase of the detection error pd fluctuate.

When an absolute value or the like of the difference is made equal to or smaller than a predetermined value from a calculation result of the difference between the correction amount pc and the detection signal pf, it is also possible to determine that the update of the correction amount pc sufficiently converges, stop the update processing, and fix the correction amount pc to a value at the time when the update processing is stopped.

As explained above, in the motor control device according to the first embodiment, an amplitude and a phase of a detection signal in a phase of occurrence of a detection error, which occurs according to a rotating position of the motor, are sequentially estimated and an amplitude and a phase of a correction amount for suppressing the detection error are respectively updated based on results of the estimation. Therefore, to determine the amplitude and the phase of the correction amount for suppressing the detection error, it is unnecessary to determine the amplitude and the phase at separate steps. That is, sampling is unnecessary. It is possible to calculate, in a short time and with simple processing, a correction amount for suppressing a periodical oscillation due to the detection error without requiring a large-scale memory.

Second Embodiment

Figure 8:
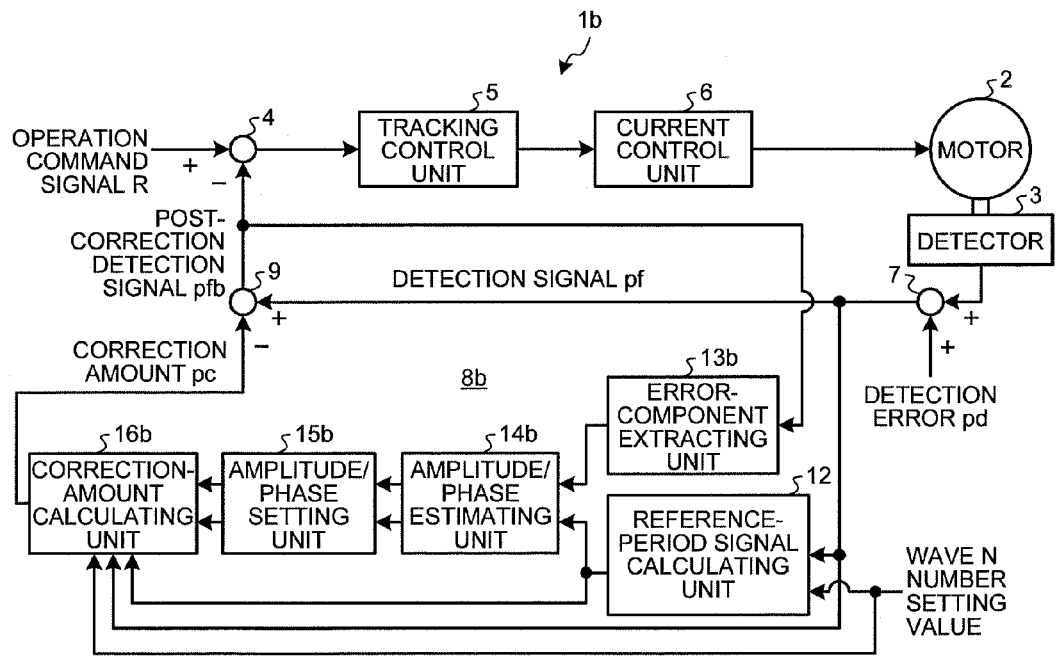
FIG. 8 is a block diagram of the configuration of a motor control device according to a second embodiment of the present invention.

FIG. 8 is a block diagram of the configuration of a motor control device according to a second embodiment of the present invention. In FIG. 8, components same as or equivalent to the components shown in FIG. 1 (the first embodiment) are denoted by the same reference numerals and signs. Sections related to the second embodiment are mainly explained below.

As shown in FIG. 8, in a motor control device 1b according to the second embodiment, a correcting unit 8b is provided instead of the correcting unit 8a in the configuration shown in FIG. 1 (the first embodiment). The correcting unit 8b includes a reference-synchronization-signal calculating unit 12, an error-component extracting unit 13b, an amplitude/phase estimating unit 14b, an amplitude/phase setting unit 15b, and a correction-amount calculating unit 16b. The signs of the error-component extracting unit 13b, the amplitude/phase estimating unit 14b, the amplitude/phase setting unit 15b, and the correction-amount calculating unit 16b are changed from those in the first embodiment.

An input to the error-component extracting unit 13b is the post-correction detection signal pfb rather than the detection signal pf. The error-component extracting unit 13b extracts, with a configuration same as the configuration of the error-component extracting unit 13a, a frequency component of the detection error pd included in the post-correction detection signal pfb. The amplitude/phase estimating unit 14b has a configuration in which the input error component 24 is changed to an error component based on the post-correction detection signal pfb in the configuration shown in FIG. 3. That is, the amplitude/phase estimating unit 14b estimates, with a method same as the method of the amplitude/phase estimating unit 14a, an amplitude and a phase of the post-correction detection signal pfb corresponding to a rotating position of the motor 2.

The amplitude/phase setting unit 15b calculates new setting values of the amplitude and the phase of the correction amount pc from the estimation results of the amplitude and the phase of the post-correction detection signal pfb received from the amplitude/phase estimating unit 14b and the amplitude and the phase of the correction amount pc set in the correction-amount calculating unit 16b at the time of the estimation in the amplitude/phase estimating unit 14b. The amplitude/phase setting unit 15b sets the setting values in the correction-amount calculating unit 16b anew.

The correction-amount calculating unit 16b calculates, with a method same as the method of the correction-amount calculating unit 16a, the correction amount pc for suppressing the detection error pd that occurs at a period of a set wave number of the wave number setting value N. That is, the correction-amount calculating unit 16b sets the amplitude and the phase set anew by the amplitude/phase setting unit 15b as estimation values of the amplitude and the phase of the correction amount pc and updates the amplitude and the phase of the correction amount pc according to a period of a reference period signal calculated by the reference-period-signal calculating unit 12 or according to a period of the detection error pd in the detection signal pf output from the detector 3.

As explained above, the correction-amount calculating unit 16b performs the update of the amplitude and the phase of the correction amount pc based on an estimation value of the post-correction detection signal pfb and the amplitude and the phase of the correction amount pc known at the time of the estimation of the post-correction detection signal pfb. By this operation as well, an amplitude and a phase of the detection signal pf can be calculated by the operation for combining the vectors shown in FIG. 4. Therefore, it is possible to suppress the detection error pd by updating the correction amount pc to be closer to the detection signal pf.

In this case as well, update processing for the correction amount pc can be performed by a method same as the method in the first embodiment. That is, as in the first embodiment, the amplitude and the phase of the detection signal pf calculated as explained above can be directly used as an amplitude and a phase of the correction amount pc after update. Alternatively, processing for adding a value obtained by multiplying the post-correction detection signal pfb with a gain for learning to the correction amount pc before update and updating the correction amount pc can be performed to reduce at least an error between the correction amount pc and the detection signal pf, that is, an absolute value of the estimated post-correction detection signal pfb. Consequently, as explained in the first embodiment, it is possible to prevent the correction amount pc from steeply changing.

As explained above, in the motor control device according to the second embodiment, an amplitude and a phase of a post-correction detection signal in a phase of occurrence of a detection error, which occurs according to a rotating position of the motor, are sequentially estimated and an amplitude and a phase of a correction amount are respectively updated from results of the estimation and an amplitude and a phase of the correction amount at the time of the estimation. Therefore, as in the first embodiment, it is possible to sequentially update the correction amount for suppressing the detection error pd. Therefore, as in the first embodiment, it is possible to calculate, in a short time and with simple processing, the correction amount pc for suppressing periodical oscillation due to the detection error.

Third Embodiment

Figure 9:
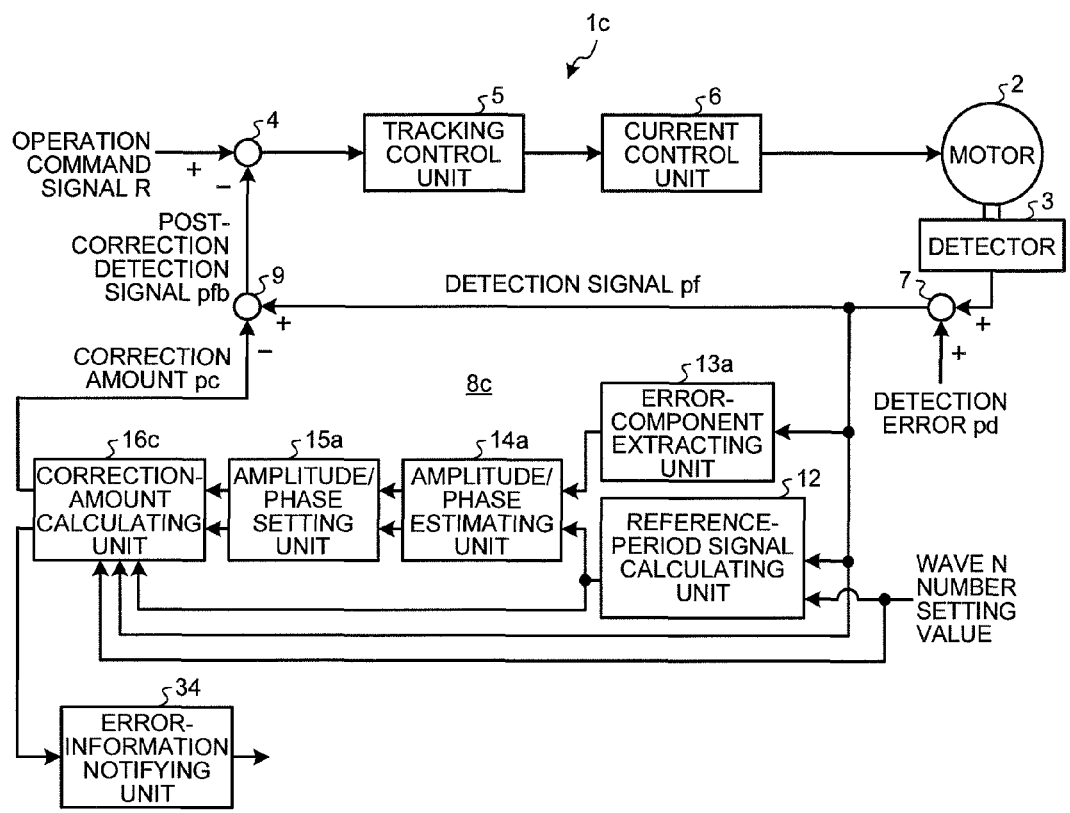
FIG. 9 is a block diagram of the configuration of a motor control device according to a third embodiment of the present invention.

FIG. 9 is a block diagram of the configuration of a motor control device according to a third embodiment of the present invention. In FIG. 9, components same as or equivalent to the components shown in FIG. 1 (the first embodiment) are denoted by the same reference numerals and signs. Sections related to the third embodiment are mainly explained below.

As shown in FIG. 9, in a motor control device 1c according to the third embodiment, an error-information notifying unit 34 is added in the configuration shown in FIG. 1 (the first embodiment). A correction-amount calculating unit 16c, the sign of which is changed from that in the first embodiment, outputs an amplitude and a phase set as feature values of the correction amount pc to the error-information notifying unit 34. The error-information notifying unit 34 notifies the outside of, as error information, the amplitude and the phase output from the correction-amount calculating unit 16c.

As explained above, in the motor control device according to the third embodiment, a feature value of a correction amount can be notified to the outside as error information in the configuration explained in the first embodiment. When an estimating operation converges, the correction amount is equal to a detection error. Therefore, notifying the outside of the feature value of the correction amount is equivalent to notifying an amplitude and a phase of the detection error. Therefore, it is possible to monitor an occurrence state of the detection error and use the occurrence state of the detection error as an index for performing a check of an attachment state of a detector and mechanical adjustment work.

Fourth Embodiment

Figure 10:
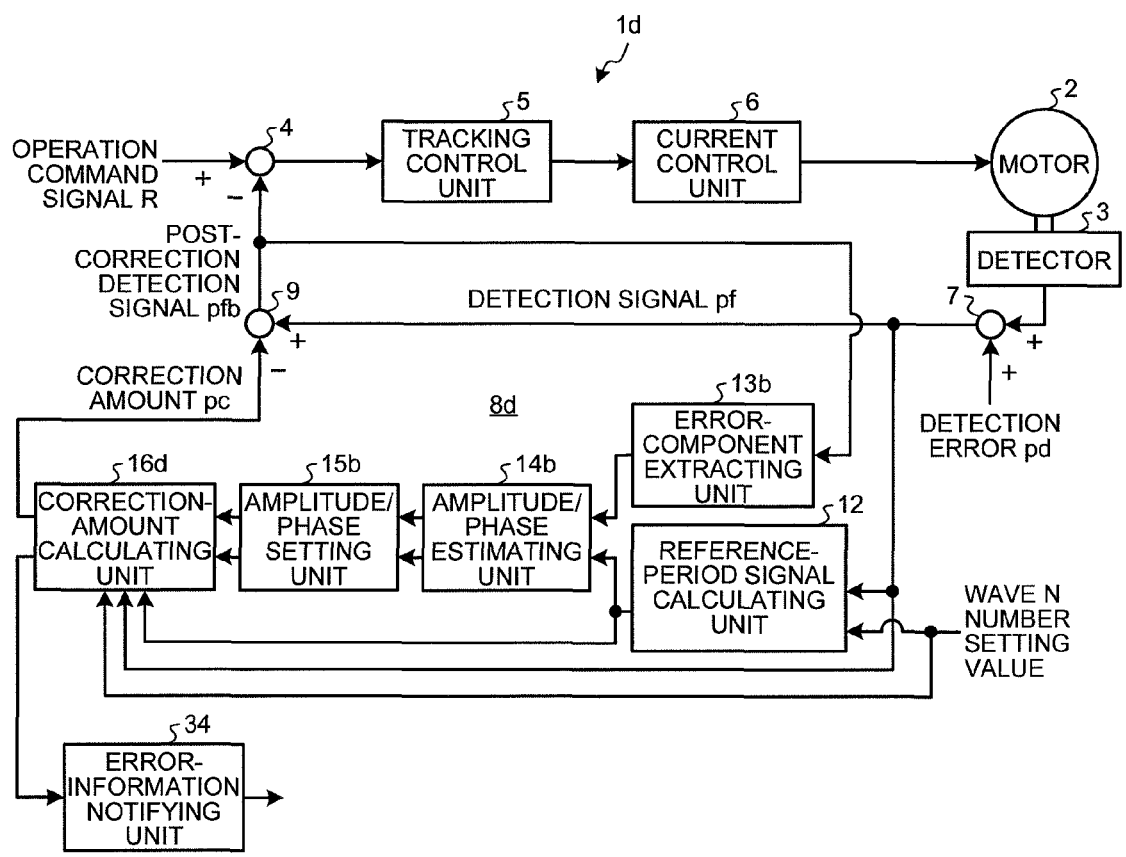
FIG. 10 is a block diagram of the configuration of a motor control device according to a fourth embodiment of the present invention.

FIG. 10 is a block diagram of the configuration of a motor control device according to a fourth embodiment of the present invention. In FIG. 10, components same as or equivalent to the components shown in FIG. 8 (the second embodiment) are denoted by the same reference numerals and signs. Sections related to the fourth embodiment are mainly explained below.

As shown in FIG. 10, in a motor control device 1d according to the fourth embodiment, the error-information notifying unit 34 is added in the configuration shown in FIG. 8 (the second embodiment). A correction-amount calculating unit 16d, the sign of which is changed from that in the second embodiment, outputs an amplitude and a phase set as feature values of the correction amount pc to the error-information notifying unit 34. The error-information notifying unit 34 notifies the outside of, as error information, the amplitude and the phase output from the correction-amount calculating unit 16d.

As explained above, in the motor control device according to the fourth embodiment, a feature value of a correction amount can be notified to the outside as error information. Therefore, as in the third embodiment, it is possible to monitor an occurrence state of a detection error and use the occurrence state of the detection error as an index for performing a check of an attachment state of a detector and mechanical adjustment work.

Fifth Embodiment

FIG. 11 is a block diagram of the configuration of a motor control device according to a fifth embodiment of the present invention. In FIG. 11, components same as or equivalent to the components shown in FIG. 1 (the first embodiment) are denoted by the same reference numerals and signs. Sections related to the fifth embodiment are mainly explained below.

As shown in FIG. 11, in a motor control device 1e according to the fifth embodiment, a correction-amplitude determining unit 35 is added and an amplitude/phase setting unit 15c is provided instead of the amplitude/phase setting unit 15a in the configuration shown in FIG. 1 (the first embodiment).

The correction-amplitude determining unit 35 determines whether an amplitude of the correction amount pc set in the correction-amount calculating unit 16a by the amplitude/phase setting unit 15c is equal to or larger than a predetermined value set in advance and outputs a determination result to the amplitude/phase setting unit 15c.

When the correction-amplitude determining unit 35 determines that the amplitude of the correction amount pc is equal to or larger than the predetermined value, the amplitude/phase setting unit 15c stops a setting operation for an amplitude and a phase of the correction amount pc and outputs setting for stopping correction by the correction amount pc to the correction-amount calculating unit 16a. According to the setting, the correction-amount calculating unit 16a stops an output operation for the correction amount pc and sets a signal level to the subtraction input end (−) of the adder 9 to a zero level. The post-correction detection signal pfb is only the detection signal pf.

As explained above, in the motor control device according to the fifth embodiment, in the configuration explained in the first embodiment, when an amplitude of a correction amount to be set in the correction-amount setting unit is equal to or larger than the predetermined value, setting of an amplitude and a phase of the correction amount is not performed and an output of the correction amount is stopped. Therefore, in a feedback control system, an operation for driving a motor to reduce a difference between an operation command signal and a detection signal is performed.

Consequently, when an estimating operation is performed under a condition other than the converging condition (the complementary sensitivity function of the control system is smaller than the value 1) explained in the configuration shown in FIG. 2, it is possible to prevent a situation in which the estimating operation becomes unstable and an excessive correction amount is added to a detection signal. Therefore, it is possible to realize a stable estimating operation and prevent estimation of a correction amount from malfunctioning depending on an operation condition.

It goes without saying that the error-information notifying unit 35 explained in the third embodiment can be provided in the motor control device according to the fifth embodiment.

Sixth Embodiment

FIG. 12 is a block diagram of the configuration of a motor control device according to a sixth embodiment of the present invention. In FIG. 12, components same as or equivalent to the components shown in FIG. 8 (the second embodiment) are denoted by the same reference numerals and signs. Sections related to the sixth embodiment are mainly explained below.

As shown in FIG. 12, in a motor control device if according to the sixth embodiment, the correction-amplitude determining unit 35 is added and an amplitude/phase setting unit 15d is provided instead of the amplitude/phase setting unit 15b in the configuration shown in FIG. 8 (the second embodiment).

The correction-amplitude determining unit 35 determines whether an amplitude of the correction amount pc set in the correction-amount calculating unit 16b by the amplitude/phase setting unit 15d is equal to or larger than a predetermined value set in advance and outputs a determination result to the amplitude/phase setting unit 15d.

When the correction-amplitude determining unit 35 determines that the amplitude of the correction amount pc is equal to or larger than the predetermined value, the amplitude/phase setting unit 15d stops a setting operation for an amplitude and a phase of the correction amount pc and outputs setting for stopping correction by the correction amount pc to the correction-amount calculating unit 16b. According to the setting, the correction-amount calculating unit 16b stops an output operation for the correction amount pc and sets a signal level to the subtraction input end (−) of the adder 9 to a zero level. The post-correction detection signal pfb is only the detection signal pf.

As explained above, in the motor control device according to the sixth embodiment, in the configuration explained in the second embodiment, as in the fifth embodiment, when an amplitude of a correction amount to be set in the correction-amount setting unit is equal to or larger than the predetermined value, setting of an amplitude and a phase of the correction amount is not performed and an output of the correction amount is stopped. Therefore, as in the fifth embodiment, it is possible to realize a stable estimating operation and prevent estimation of a correction amount from malfunctioning depending on an operation condition.

It goes without saying that the error-information notifying unit 35 explained in the fifth embodiment can be provided in the motor control device according to the sixth embodiment.

Seventh Embodiment

Figure 13:
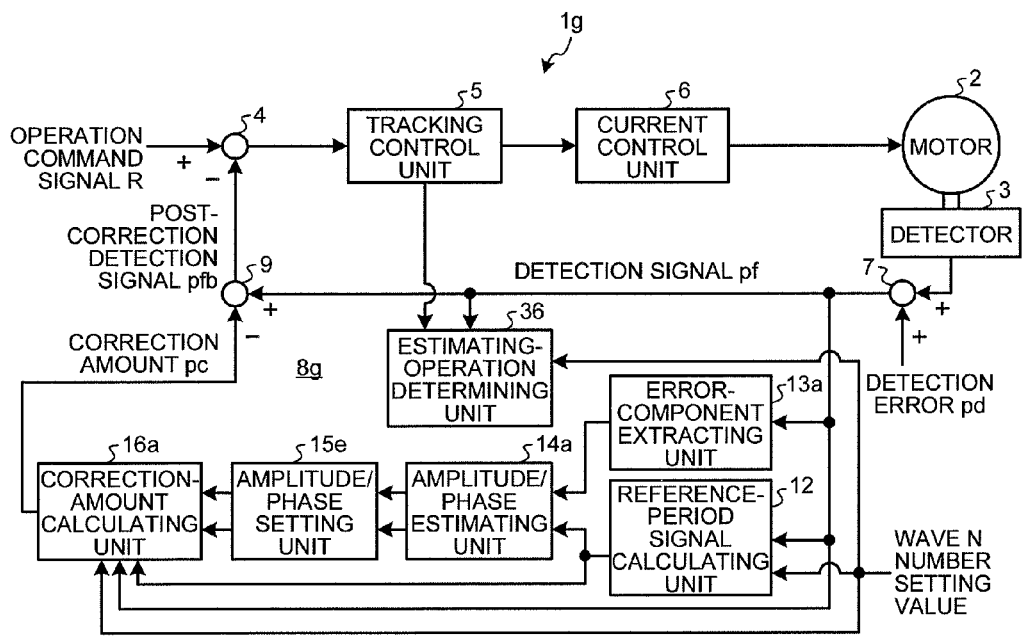
FIG. 13 is a block diagram of the configuration of a motor control device according to a seventh embodiment of the present invention.

FIG. 13 is a block diagram of the configuration of a motor control device according to a seventh embodiment of the present invention. In FIG. 13, components same as or equivalent to the components shown in FIG. 1 (the first embodiment) are denoted by the same reference numerals and signs. Sections related to the seventh embodiment are mainly explained below.

As shown in FIG. 13, in a motor control device 1g according to the seventh embodiment, an estimating-operation determining unit 36 is added and an amplitude/phase setting unit 15e is provided instead of the amplitude/phase setting unit 15a in the configuration shown in FIG. 1 (the first embodiment).

As explained using the feedback control system shown in FIG. 2, a condition under which an estimating operation converges is that the frequency of the detection error pd is outside the control band. If the number of times of the detection error pd generated per one revolution of the motor 2 is known, it is possible to calculate the frequency of the detection error pd from the position and the speed of the motor 2. The control band of the feedback control system shown in FIG. 2 depends on a gain value set in the tracking control unit 5.

The estimating-operation determining unit 36 calculates a frequency of the detection error pd included in the detection signal pf from the set wave number of the wave number setting value N, determines, based on the calculated frequency of the detection error pd and the gain value set in the tracking control unit 5, whether an estimating operation for the correction amount pc is performed under the condition under which the estimating operation converges, and outputs a determination result to the amplitude/phase setting unit 15e.

When the estimating-operation determining unit 36 determines that the estimating operation for the correction amount pc is performed under a condition under which the estimating operation does not converge, i.e., when the frequency of the detection error pd is within the control band, the amplitude/phase setting unit 15*e* sets a setting value output to the correction-amount calculating unit 16*a* to a fixed value. Consequently, the correction-amount calculating unit 16*a* stops update of the correction amount pc and outputs a correction amount of the fixed value set by the amplitude/phase setting unit 15*e*.

As explained above, with the motor control device according to the seventh embodiment, in the configuration of the first embodiment, according to whether a frequency of a detection error is within or outside the control band, it is determined whether an updating operation for a correction amount can be continued. Therefore, it is possible to prevent an estimating operation from being performed under a condition other than the converging condition (the complementary sensitivity function of the control system is smaller than the value 1) explained with reference to FIG. 2. It is possible to realize a stable estimating operation.

In addition, with the motor control device according to the seventh embodiment, it is possible to automatically discriminate the converging condition and switch execution and stop of the estimating operation. Therefore, it is possible to always carry out update of the correction amount pc during motor driving. That is, it is possible to always enable a correction amount by automatically discriminating a condition under which estimation of the correction amount is stably performed. Therefore, even when a detection error changes as in, for example, aged deterioration, it is possible to take measures.

It goes without saying that the error-information notifying unit 35 explained in the third embodiment can be provided in the motor control device according to the seventh embodiment.

Eighth Embodiment

Figure 14:
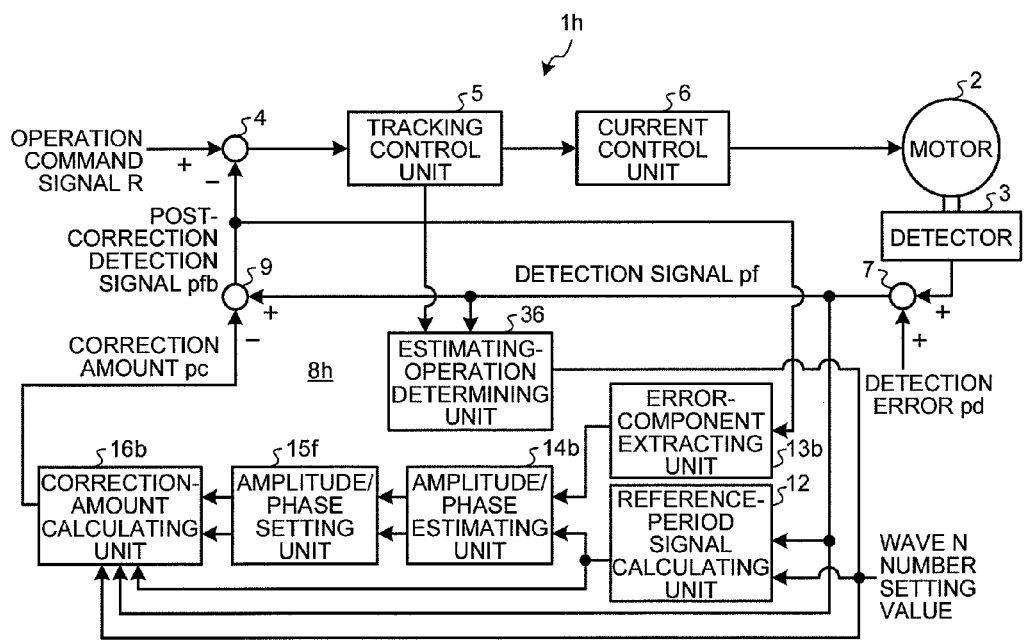
FIG. 14 is a block diagram of the configuration of a motor control device according to an eighth embodiment of the present invention.

FIG. 14 is a block diagram of the configuration of a motor control device according to an eighth embodiment of the present invention. In FIG. 14, components same as or equivalent to the components shown in FIG. 8 (the second embodiment) are denoted by the same reference numerals and signs. Sections related to the eighth embodiment are mainly explained below.

As shown in FIG. 14, in a motor control device 1*h* according to the eighth embodiment, the estimating-operation determining unit 36 is added and an amplitude/phase setting unit 15*f* is provided instead of the amplitude/phase setting unit 15*b* in the configuration shown in FIG. 8 (the second embodiment).

As in the seventh embodiment, the estimating-operation determining unit 36 calculates a frequency of the detection error pd included in the detection signal pf from the set wave number of the wave number setting value N, determines, based on the calculated frequency of the detection error pd and the gain value set in the tracking control unit 5, whether an estimating operation for the correction amount pc is performed under the condition under which the estimating operation converges, and outputs a determination result to the amplitude/phase setting unit 15*f*.

When the estimating-operation determining unit 36 determines that the estimating operation for the correction amount pc is performed under a condition under which the estimating operation does not converge, i.e., when the frequency of the detection error pd is within the control band, like the amplitude/phase setting unit 15*e*, the amplitude/phase setting unit 15*f* sets a setting value output to the correction-amount calculating unit 16*b* to a fixed value. Consequently, the correction-amount calculating unit 16*b* stops update of the correction amount pc and outputs a correction amount of the fixed value set by the amplitude/phase setting unit 15*f*.

As explained above, with the motor control device according to the eighth embodiment, in the configuration explained in the second embodiment, just like the seventh embodiment according to whether a frequency of a detection error is within or outside the control band, it is possible to determine whether an updating operation for a correction amount can be continued. Therefore, as in the seventh embodiment, it is possible to realize a stable estimating operation. Further, because it is possible to always enable a correction amount, even when a detection error changes as in, for example, aged deterioration, it is possible to take measures.

It goes without saying that the error-information notifying unit 35 explained in the third embodiment can be provided in the motor control device according to the eighth embodiment.

As explained above, the motor control device according to each of the first to eighth embodiments adopts a system for sequentially estimating an amplitude and a phase, which are feature values, of a detection signal before or after correction and learning a correction amount using the amplitude and the phase of the detection signal. Therefore, it is possible to calculate the amplitude and the phase simultaneously and with simple processing. Because it is possible to estimates parameters of the amplitude and the phase simultaneously and with simple processing, it is possible to estimate the parameters in a short time. Further, because sequential processing is performed, a memory is made unnecessary and it is possible to always enable the correction amount.

Further, because it is possible to calculate a correction amount without using a separate high-precision detector, it is possible to easily perform adjustment work. In addition, it is possible to calculate a correction amount without the necessity of driving the motor at sufficiently high speed that a speed loop characteristic does not follow up or with a speed loop opened. Therefore, it is possible to highly accurately calculate the correction amount.

The present invention is not limited to the embodiments and, in an implementation stage, can be variously modified without departing from the spirit of the present invention. Each of the embodiments includes inventions in various stages. Various inventions can be extracted according to appropriate combinations of a plurality of constituent features disclosed herein. For example, when the problems explained in the background can be solved and the effects explained in the summary can be obtained even if several constituent features are deleted from all the constituent features explained in the embodiments, a configuration in which the constituent features are deleted can be extracted as an invention. Further, the constituent features explained in the different embodiments can be combined as appropriate.

INDUSTRIAL APPLICABILITY

As explained above, the motor control device according to the present invention is useful as a motor control device that can accurately suppress, with simple processing and in a short time, a detection error that occurs because of an assembly error, a shape error, or the like of a detector. In particular, the motor control device is suitable for a motor control device that drives a motor for driving an industrial machine.

| Reference Signs List | |
|---|---|
| 1a to 1h | motor control device |
| 2 | motor |
| 3 | detector |
| 4, 7, 9 | adders |
| 5 | tracking control unit |
| 6 | current control unit |
| 8a to 8h | correcting units |
| 10 | controller corresponding to the tracking control unit |
| 11 | control system including the current control unit, the motor, and the detector |
| 12 | reference-period-signal calculating unit |
| 13a, 13b | error-component extracting units |
| 14a, 14b | amplitude/phase estimating units |
| 15a to 15f | amplitude/phase setting units |
| 16a to 16d | correction-amount calculating units |
| 17 | phase correcting unit |
| 18, 21 | multipliers |
| 19, 22 | direct-current-component calculating units |
| 20 | PI control unit |
| 23 | amplifying unit |
| 34 | error-information notifying unit |
| 35 | correction-amplitude determining unit |
| 36 | estimating-operation determining unit |

The invention claimed is:

1. A motor control device including a feedback control system that generates a torque command for reducing a difference between an operation command signal for commanding an operation of a motor and a detection signal of a detector attached to the motor to detect a position and speed of the motor and drives the motor, the motor control device comprising:

a correcting unit configured to estimate, according to a wave number set as the number of occurrences of a detection error included in the detection signal per one revolution of the motor, an amplitude and a phase of a correction amount for suppressing the detection error and sequentially update estimation values of the amplitude and the phase; and a post-correction-detection-signal calculating unit configured to generate, as a target signal for calculating a difference from the operation command signal, a post-correction detection signal, which is a difference between the detection signal and the correction amount, instead of the detection signal.

2. The motor control device according to claim 1, wherein the correcting unit includes:

a reference-period-signal calculating unit configured to calculate a reference period signal having a period same as the set wave number of the detection error; and an amplitude/phase estimating unit configured to estimate, based on the reference period signal and the detection signal, an amplitude and a phase of the detection signal in an angle range indicated by the wave number, wherein the correcting unit updates the amplitude and the phase of the correction amount to reduce a difference between the detection signal and the correction amount using the amplitude and the phase of the detection signal estimated by the amplitude-phase estimating unit.

3. The motor control device according to claim 1, wherein the correcting unit includes:

a reference-period-signal calculating unit configured to calculate a reference period signal having a period same as the set wave number; and an amplitude/phase estimating unit configured to estimate, based on the reference period signal and the post-correction detection signal, an amplitude and a phase of the post-correction detection signal in an angle range indicated by the wave number, wherein the correcting unit updates the amplitude and the phase of the correction amount to reduce a difference between the detection signal and the correction amount using the amplitude and the phase of the detection signal estimated by the amplitude-phase estimating unit.

4. The motor control device according to claim 2, wherein the correcting unit performs the updating operation according to the period of the reference period signal.

5. The motor control device according to claim 2, wherein the correcting unit performs the updating operation according to a period of the detection error in the detection signal.

6. The motor control device according to claim 1, wherein the correcting unit further includes an error-information notifying unit configured to notify the updated amplitude and the updated phase of the correction amount as error information.

7. The motor control device according to claim 1, wherein the correcting unit further includes a correction-amplitude determining unit configured to determine whether the updated amplitude of the correction amount is equal to or larger than a predetermined threshold, and when the amplitude of the correction amount is equal to or larger than the threshold, the correcting unit does not give the correction amount to the post-correction-detection-signal calculating unit.

8. The motor control device according to claim 1, wherein the correcting unit further includes an estimating-operation determining unit configured to determine, from a gain value set for calculation of the torque command and a frequency of the detection error obtained from the set wave number of the detection error, whether or not the frequency of the detection error is outside a control band, and when the frequency of the detection error is within the control band, the correcting unit gives the correction amount not updated by the correcting unit to the post-correction-detection-signal calculating unit.

9. The motor control device according to claim 3, wherein the correcting unit performs the updating operation according to the period of the reference period signal.

10. The motor control device according to claim 3, wherein the correcting unit performs the updating operation according to a period of the detection error in the detection signal.

* * * * *